United States Patent [19]

Watanabe et al.

[11] Patent Number: 4,861,378

[45] Date of Patent: Aug. 29, 1989

[54] CEMENT ADDITIVE CONTAINING SUPERPLASTICIZER AND BENTONITE

[75] Inventors: Yoshiharu Watanabe; Hisayuki Shimizu; Mineo Ito, all of Niigata; Hitoshi Moriyama, Itoigawa, all of Japan

[73] Assignee: Denki Kagaku Kogyo Kabushiki Kaisha, Tokyo, Japan

[21] Appl. No.: 166,418

[22] Filed: Mar. 10, 1988

[30] Foreign Application Priority Data

Mar. 13, 1987 [JP] Japan ................................. 62-56425
Mar. 13, 1987 [JP] Japan ................................. 62-56426

[51] Int. Cl.$^4$ ............................................ C04B 24/20
[52] U.S. Cl. .................................... 106/314; 106/90; 106/315; 106/DIG. 4
[58] Field of Search ................. 106/314, 315, DIG. 4, 106/90

[56] References Cited

FOREIGN PATENT DOCUMENTS

| 59-213655 | 12/1984 | Japan | 106/90 |
| 61-026546 | 2/1986 | Japan | 106/90 |
| 62-007654 | 1/1987 | Japan . | |
| 994741 | 2/1983 | U.S.S.R. | 106/90 |

OTHER PUBLICATIONS

Chemical Abstract No. 107:82857z.

Primary Examiner—William R. Dixon, Jr.
Assistant Examiner—Anthony J. Green
Attorney, Agent, or Firm—Limbach, Limbach & Sutton

[57] ABSTRACT

A cement additive contains a superplasticizer, an inorganic strength increasing agent such as calcium sulfate or silica fume and bentonite.

6 Claims, 1 Drawing Sheet

FIG.

CEMENT ADDITIVE CONTAINING SUPERPLASTICIZER AND BENTONITE

BACKGROUND OF THE INVENTION

This invention relates to a cement additive containing a superplasticizer and bentonite and more particularly to a cement additive for eliminating tackiness of a cement composition and preventing the cement composition from cracking at an initial stage upon drying before the cement composition is hardened.

As compared with common plasticizers, such as ligninsulfonate or polyol type plasticizers, now in popular use in ready-mixed concrete plants, superplasticizers have desirable properties in that a cement composition or concrete having only low set retarding and air entraining properties, a high water reducing ratio and high strength may be easily produced even when a larger amount of the superplasticizer is added to the cement. However, the concrete admixed with the superplasticizer exhibits properties totally different in the unhardened state from those of the concrete admixed with the common plasticizers. Specifically, the former exhibits strong tackiness and non-bleeding. Thus, the following problems are presented in construction works employing such concrete.

More specifically, on account of strong tackiness, the concrete sags or slides down along a tilt if it exists on the construction site, so that the construction works are obstructed. In addition, on account of non-bleeding properties, the water in the concrete is lost on drying before the concrete is hardened, thus causing cracking upon drying due to plastic shrinkage. While such cracking occurs after lapse of more or less time interval since the time of casting, depending on the ambient temperature, humidity and the wind force prevailing at the time of construction, it may occur after lapse of a shorter time interval, such as 20 to 30 minutes, in an extreme case, with the width of crack being as large as 2 to 5 mm. In addition, because of strong tackiness and non-bleeding properties, coarse aggregates float on the concrete surface, while a skin is formed on drying on the concrete surface so that the troweling operation is obstructed, thus resulting in only poor surface finishing. Even when water is sprayed on the concrete surface to improve its surface finishing, the aggregates cannot be sunk because floating of the aggregates in the concrete is mainly caused by tackiness of the concrete. On the contrary, the superplasticizers in the concrete may float to cause an irregular color and adversely affect the surface finish such as uniform color and smoothness.

It is thus seen from the above that although the superplasticizers are superior to ordinary plasticizers in certain aspects when used for preparation of high strength concrete, they have not come into customary use in civil engineering and construction works in general, only because of the above problems. Although it is strongly desired to solve these problems, the art or technology which provides direct solution of these problems has not been evolved.

On the other hand, strength of the concrete admixed only with the superplasticizer ceases to increase when the concrete is dried during curing, with the resulting strength being fluctuated appreciably and occasionally reaching only a lower value depending on the degree of drying. Thus, the strength cannot be designed in large-sized civil engineering and construction works where it is not possible to perform sufficient wet curing.

It is known to add calcium sulfates, above all, Type II anhydrous calcium sulfate, in order that a sufficient design strength be obtained even upon drying, while it is also known to produce a high strength concrete by using citric acid or salts thereof, carbonates of alkali metals or siliceous materials in combination, as shown for example Japanese Laid-open Patent Publication No. 167460/1983. However, the above problems resulting from strong tackiness of the concrete employing the superplasticizer cannot be solved by these methods.

Although the art of improving concrete strength by using the superplasticizer and calcium sulfates simultaneously is now in popular use in factories producing concrete articles with the use of steam curing, the fact is that only a centrifugal casting mold is actually employed which is not affected by various problems resulting from concrete tackiness, while the art cannot be applied extensively to pre-cast members for which finishing is required, because the finishing properties are low while cracking on drying may be produced during pre-curing.

SUMMARY OF THE INVENTION

It is a principal object of the present invention to provide a cement additive effective in eliminating tackiness and improving the workability of a cement composition.

It is another object of the present invention to provide a cement additive effective in preventing a cement composition from cracking upon drying, especially from cracking at an initial stage upon drying before the cement composition is hardened.

It is a further object of the present invention to provide a cement additive for obtaining a hardened mass of the cement composition capable of exhibiting high strength in stability in spite that the composition contains superplasticizers.

It is yet another object of the present invention to provide a cement additive for obtaining a hardened mass of a cement composition having improved surface finish and smoothness and free from irregular color.

The above and other objects of the invention will become apparent from the following description.

According to the present invention, there is provided a cement additive comprising a superplasticizer, an inorganic strength increasing agent and a bentonite.

PREFERRED EMBODIMENTS OF THE INVENTION

The present invention will be explained in detail.

The present inventors conducted eager researches into eliminating tackiness, preventing cracking upon drying before hardening and improving surface finishing properties of a hardened mass of a cement composition containing a superplasticizer and an inorganic strength improving agent, without drastically lowering the high strength properties of the hardened mass. As a result, we have found that a cement composition having excellent properties can be obtained by employing bentonite in combination with the superplasticizer and the inorganic strength improving agent and, based on this finding, arrived at a cement additive of the present invention.

The superplasticizers that may be employed in accordance with the present invention include polyalkylaryl sulfonate type superplasticizer and melamine/formalin resin sulfonate type superplasticizer. The superplasticizers presently on the market are composed mainly of one or more of these components. However, any plasticizers not composed of the above components but exhibiting strong tackiness and non-bleeding properties may be employed as the superplasticizer of the present invention.

The polyalkylaryl sulfonate type superplasticizer includes a condensation product of naphthalene sulfonic acid with formalin or a salt thereof, a condensation product of methylnaphthalene sulfonic acid with formalin or a salt thereof, and a condensation product of anthracene sulfonic acid with formalin or a salt thereof.

The polyalkylaryl sulfonate type superplasticizers are marketed under the trade names of "MIGHTY 100", "MIGHTY 150" and "MIGHTY 200" by KAO Corporation; "SELFLOW-110P" by Dai-ichi Kogyo Seiyaku Co., Ltd.; "POLFINE 510N" by Takemoto Oil and Fat Co. Ltd.; "SANFLO-PS" and "SANFLO-PSR" by Sanyo-Kokusaku Pulp Co. Ltd.; and "FT-500" by Denki Kagaku Kogyo KK. The melamine/formalin resin sulfonate type superplasticizers are marketed under the trade names of "MELMENT F-10" and "MELMENT F-20" by Showa Denko KK. and "NL-4000" by Nisso Master Builders Co., Ltd.

These superplasticizers are preferably added in an amount of 0.25 to 5 parts by weight as solid contents to 100 parts by weight of the cement. With the amount of the superplasticizer less than 0.25 parts by weight, the properties of the superplasticizer, such as water reducing properties, cannot be exhibited. The contents of the superplasticizer in excess of 5 parts by weight are also not desirable from economical considerations and because the increase in water reducing properties cannot be expected. The superplasticizers are preferably added in an amount of 0.35 to 3 parts by weight and more preferably in an amount of 0.45 to 2 parts by weight.

The inorganic strength improving agents that may be employed in accordance with the present invention include calcium sulfates, silica fume and mixtures thereof.

The calcium sulfates include Type II anhydrous calcium sulfate, Type III anhydrous calcium sulfate, calcium sulfate hemihydrate and dihydrate. Usually, one of these calcium sulfates is used alone or two or more of these calcium sulfates are used in combination. There are no special restrictions as to the amounts or kinds of the industrially inevitable impurities insofar as calcium sulfates are reacted with aluminate in the cement and the resulting hydrates are converted into ettrigite.

The calcium sulfates may be contained in an amount of 15 parts by weight or less, preferably 1 to 13 parts by weight and more preferably 2 to 10 parts by weight calculated as anhydrous form to 100 parts by weight of cement. From the viewpoint of strength, the optimum amount of addition of the calcium sulfates to cement depends mainly on the curing temperature, such that, the higher the temperature, the more the amount of the calcium sulfates that need be added to cement to achieve the maximum strength. For steam curing at 60° to 80° C., the peak value of addition of the calcium sulfates is 10 to 13 parts by weight. The amount of the calcium sulfates in excess of 15 parts by weight is not desirable since the strength is not increased but rather starts to be lowered slightly. For steam curing at about 20° C., the peak value of addition of the calcium sulfates is 4 to 6 parts by weight. For steam curing at lower temperatures, it is 3 to 5 parts by weight. The amount of addition of the calcium sulfates less than 1 part by weight has little effect even for lower steam curing temperatures. The specific surface area of the calcium sulfates may be not less than 2,000 cm$^2$/g (Blaine value, porosity of 0.5), preferably not less than 3,000 cm$^2$/g and more preferably 4,000 cm$^2$/g.

The silica fumes employed in the present invention are spherical fine amorphous $SiO_2$ by-produced during production of Si metal or Si-Fe alloy in an electric furnace. The silica fumes have high pozzolanic activity and may be reacted easily with $Ca(OH)_2$ (Portlandite) in the hardened mass of cement to form calcium silicate hydrates to improve the strength. It is preferred that 20 parts by weight or less and desirably 2 to 15 parts by weight of the silica fumes be added to 100 parts by weight of cement. The particle size of the silica fumes is so small that, with the amount of the silica fumes in excess of 20 parts by weight, concrete tackiness is increased, and more bentonite is needed with the unit volume of water increased and with the concrete strength lowered. The amount of the silica fumes less than 2 parts by weight is not desirable since it has only a little effect on increasing the concrete strength.

Addition of the calcium sulfate simultaneously with silica fumes has a favorable effect on the strength even when the amount of addition of the silica fumes is reduced. Such reduction in the amount of addition of the silica fumes is convenient since a smaller amount of bentonite is sufficient to lower the tackiness. In such a case, the amount of 3 to 10 parts by weight of the silica fumes is preferred.

The bentonite is contained in concrete in combination with the superplasticizer to lower the tackiness, while elevating water retention properties, preventing cracking and vaporization of water contents and improving finishing properties. While it is preferred that the bentonite be added in an amount of 0.1 to 10 parts by weight to 100 parts by weight of cement, the optimum amount of addition of bentonite cannot be determined monistically since it may differ depending on the swelling degree of bentonite, concrete temperature or the amount of addition of the superplasticizer to cement. Even in consideration of possible variable factors, the amount of bentonite less than 0.1 part by weight is ineffective and hence not desirable, while the amount of bentonite in excess of 10 parts by weight is also not desirable since the percentage of the water reduction proper to the superplasticizer may be lowered significantly. The preferred amount of addition of bentonite is 0.3 to 6 parts by weight.

There are no restrictions as to the particle size of bentonite and the particle sizes of marketed products may be employed without any adjustment. If bentonite has approximately the same swelling degree, bentonite with 200-mesh or 400-mesh particle size may be used without any difference in effect.

According to the present invention, organic acids and/or salts and/or derivatives thereof may be added besides the above enumerated essential ingredients. The organic acids that may be used in the present invention include soluble organic acids including COOH-group or groups or simultaneously including COOH- and OH-groups, metal salts and/or derivatives thereof, and may contain unsaturated organic acids with chemical addition of alkyl- or aryl groups and condensation or copolymerization products thereof. Lower carboxylic acids available on the market include oxalic acid, maleic acid, fumaric acid, malonic acid, succinic acid, glutaric acid, adipic acid and metal salts thereof. Oxymonocarboxylic acids include lactic acid, heptonic acid, gluconic acid, glycolic acid and metal salts thereof. Polyvalent oxycarboxylic acids include malic acid, tartaric acid, citric acid and metal salts thereof. The common feature of these organic acids and salts thereof is that although they retard the setting of cement, if used in moderate amounts and simultaneously with bentonite, these organic acids and salts thereof are effective to reduce the lowering of the concrete strength even if the water to cement ratio is increased slightly. Above all, the polyvalent oxycarboxylic acids are effective to prevent faster slump drop which presents another inconvenience of the concrete admixed with the superplasticizer. The preferred polyvalent oxycarboxylic acids include malic acid, tartaric acid, citric acid and salts thereof, with the citric acid and salts thereof being most preferred. It is preferred that the amount of addition of the organic acids and salts thereof be 0.005 to 0.5 part by weight to 100 parts by weight of cement. More preferably, it is 0.01 to 0.35 part by weight and most preferably it is 0.05 to 0.25 part by weight. The amount of the organic acids and salts thereof less than 0.005 part by weight is not desirable since it has only a little effect in improving the strength, while the amount larger than 0.5 part by weight is not desirable since it retards cement setting and hence evolution of strength excessively.

According to the present invention, certain inorganic salts may be added to cement. These inorganic salts include carbonates, bicarbonates, silicates or aluminates of alkali metals such as lithium, sodium or potassium, alums of sodium or potassium, aluminum sulfate and magnesium sulfate. These inorganic salts assisting the 5 effect of bentonite are preferably employed in an amount not more than 1.0 part by weight, calculated as the anhydride, to 100 parts by weight of cement. The amount of the inorganic salts above the upper limit is not desirable since it is not effective and there are certain components that cause false or rapid setting. The most preferred range of addition is 0.1 to 0.5 part by weight.

The cements to which the cement additive of the present invention may be added include various Portland cements, mixed cements and hydraulic materials containing slag particles as essential components. The rapid hardening Portland cement is not effective in view of high strength since it contains alumina cement, $12CaO.7Al_2O_3$, $11CaO.7Al_2O_3.CaF_2$ or amorphous calcium aluminate including $CaO.Al_2O_3$, $12CaO\ 7Al_2O_3$, etc. as well as Type II anhydrous calcium sulfate. The rapid hardening is accompanied by rapid heat evolution so that the effect of the organic acids and salts thereof in decreasing the amount of water necessary for cement hydration and in improving the strength is lost.

It is noted that any desired method may be employed for mixing or adding the above enumerated various components or ingredients. For example, the various components may be previously mixed within the prescribed ranges of addition to cement before ultimate addition to cement. If the superplastcizer is in the liquid form, a moderate amount of water may be added thereto to form a slurry composition. Alternatively, the various components may be added separately during production of concrete products.

EXAMPLES OF THE INVENTION

The present invention will be described more specifically with reference to some examples thereof.

EXAMPLE 1

Concrete samples were prepared basically following the concrete composition shown in Table-1 by changing the kinds and the amounts of addition of plasticizers, calcium sulfates, silica fumes and bentonite, and were kneaded separately. After standard curing for 28 days, these samples were tested for compressive strength, degree of tackiness and cracking upon drying, while the smoothness of the concrete samples after troweling was observed with nacked eyes. In testing the compressive strength, the specimens each 10 cm in diameter and 20 cm in length were used.

Figure 1:
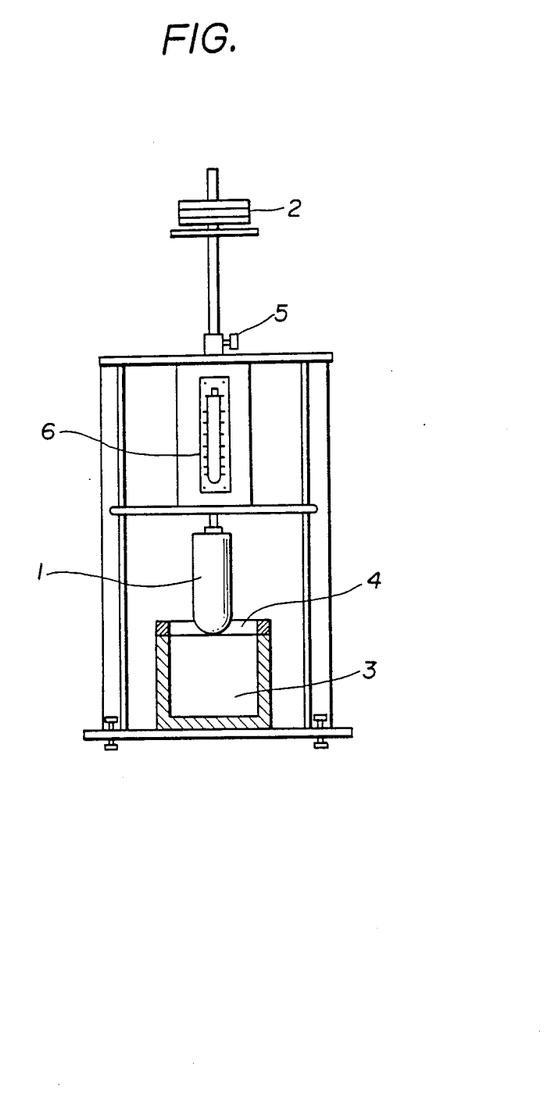
The sole FIGURE is a diagrammatic elevational view partly in section showing a device for measuring tackiness of a concrete composition.

In measuring the viscosity, a device was employed in which only the sample container of the Wilsnack type plastometer shown in the drawing was remodelled for use with concrete.

In conducting the test using the above device, a plunger 1 weighing 2,376 g and adapted to fall vertically was adapted so that any desired number of weight discs 2 may be placed on it. The concrete was filled in a sample container 3. After the concrete surface was smoothed, a collar 4 was placed on the container, which was then placed at the center of the testing device. The plunger 1 was set so that its tip contacts the concrete surface. A screw 5 was then tightened to fasten the plunger.

Then, suitable weight discs 2 were placed on the plunger, which was then unfastened. Two different weight disc sets were selected corresponding to the penetration of the plunger to about 10 and 5 cm into the concrete. By proprotional distribution, the weight of the weight discs corresponding to the penetration to stop at the position of 7.5 cm was measured.

It is determined that the sample shows good penetrability and is free from tackiness while showing plastic properties with improved troweling finishing when the weight of the weight discs is smaller for approximately the same slump (s1).

In observing cracking, the concrete was packed in a wooden container 100 cm long, 50 cm wide and 10 cm high, with the lateral sides being bent inwardly to form a butterfly shape s that cracking will be formed at the center of the box. The concrete was troweled and placed stationarily in a test chamber. The state of finishing was observed simultaneously.

TABLE 1

| Gmax (mm) | S/a (%) | W/C (%) | Air (%) | Sl (cm) | Unit Amount (kg/m³) | | | |
|---|---|---|---|---|---|---|---|---|
| | | | | | Cement | Water | Sand | Crushed Stone |
| 15 | 45 | 40 | 1.0 | 10 ± 2 | 450 | 180 | 796 | 984 |

Materials Used
Cement: Normal Portland Cement produced by Denki Kagaku Kogyo KK
Sand: River Sand from Himekawa, Niigata Prefecture
Crushed Stone: Crushed stone from Himekawa, Niigata Prefecture It will be noted that, when the superplasticizers are admixed with the concrete composition of Table-1, a smaller unit amount of water suffices to produce the same slump. Thus, for slump matching, only the unit amount of water was reduced without correcting the amounts of cement, sand and crushed stone. Also the amount of sand was reduced by an amount equal to the sum of the amounts of the calcium sulfates and bentonite in the cement additive to be added to cement.

60 liters of concrete was kneaded in a forcedly kneading type mixer of 100 liter capacity to carry out predetermined tests.

The test results are shown in Table-2.

The various superplasticizers and bentonite employed in Table-2 are available through commercial routes.

The following materials were employed.

Superplasticizer

A: "SELFLOW-110P", powdered, polyalkylaryl sulfonate type
B: "MIGHTY 100", powdered
C: "MIGHTY 150", liquid, with solid contents of 42%
D: "POLFINE 510 N", liquid, with solid contents of 44%
E: "SANFLO PSR 120", liquid, with solid contents of 44%
F: "FT-500", liquid, with solid contents of 45%
G: "MIGHTY 2000", liquid, with solid contents of 50%
H: "MELEMNT F-10", powdered, melamine/formalin resin sulfonate type
I: "MELMENT F-20 ", powdered, melamine/formalin resin sulfonate type

Calcium Sulfate

I. anhydrous calcium sulfate (calcium sulfate by-produced during generation of hydrofluoric acid); Blaine value, 4,000 cm$^2$/g
II. calcium sulfate dihydrate (for industrial usage)
III. calcium sulfate hemihydrate (obtained by drying calcium sulfate dihydrate at 150° C. for two hours)
IV. soluble anhydrous calcium sulfate (obtained by further drying calcium sulfate hemihydrate at 200° C. for two hours)

Silica Fume

V. by-product from a ferrosilicon furnace

Bentonite a-1 bentonite (degree of swelling by the ACC method, about 15)
a-2 bentonite (degree of swelling by the ACC method, about 25)
a-3 bentonite (degree of swelling by the ACC method, about 30)

The concrete temperature was 20° C, concrete penetrability was measured in a room at 20° C, and cracking of the concrete was observed after five hours in a room at 30° C. and RH of 60 %.

In Table-2, the run Nos. 1 to 12 and 16 are comparative examples.

It is seen from Table-2 that, with the contents only of the superplasticizer in cement, the more the amount of the superplasticizer added to the cement, the higher the concrete tackiness. Hence, the larger the weight of the weight discs necessary for the plunger to penetrate by 7.5 cm. Accordingly, the more the tendency towards cracking, the longer the width of crack, and the poorer the finishing properties.

In each of the systems admixed with the superplasticizers, calcium sulfates and bentonite in accordance with the invention, the weight of the weight discs necessary for the plunger to penetrate by 7.5 cm is reduced with the amounts not less than 0.25 part by weight of the superplasticizers to 100 parts by weight of cement and with the amounts not less than 0.01 part by weight of bentonite to 100 parts by weight of cement, depending on the kind of bentonite employed. In other words, the concrete tackiness is lowered, while the finishing properties and the resistance to cracking (the properties of being relatively free from cracking and skin formation on the concrete surface upon drying due to water retention properties) are improved.

It will be easily surmised that, when more than 5 parts by weight of the superplasticizers are added to the cement, the water reduction percentage cannot be expected to be increased and that, when more than 10 parts by weight of bentonite are added to cement, only the water to cement ratio is increased, but the finishing properties and prevention of sagging or cracking aimed at in accordance with the present invention cannot be expected to be increased, while the strength is further lowered.

When comparing the example of the run No. 19 with the comparative examples of the run Nos. 4, 7 and 16, it is seen that, although the water to cement ratio tends to increase by the addition of bentonite, the strength is lowered only to a small extent despite the increased water to cement ratio since calcium sulfate tends to promote cement hydration.

It is also seen that, in the comparative examples of the Run Nos. 52 to 54 in which the superplasticizer and silica fume are employed, the larger the amounts of the silica fume added to cement, the more the tackiness and the larger the amount of plunger penetration, whereas, in the present examples of the Run Nos. 46 to 51, concrete tackiness is reduced and, above all, in the present examples of the Run Nos. 55 to 58, the strength of the concrete is markedly improved by using calcium sulfate simultaneously.

Evaluation of finish through eyes was made in three steps of X, Δ and   , wherein X indicates the state in which irregular marks of aggregates are seen on the concrete surface, Δ the state in which marks of aggregates are not seen but the mortar surface is rough, and    the state in which the mortar has a fine texture and presents a beautiful aspect.

TABLE - 2

| Run No. | Composition (wt. part) | | | | W/C (%) | Sl (cm) | Compressive Strength (kgf/cm$^2$) | Weight of Weight Discs (kg) | Width of Crack (mm) | Finish |
|---|---|---|---|---|---|---|---|---|---|---|
| | Super-plasticizer | Calcium Sulfate /Silica Fume | | Bentnite | | | | | | |
| 1 | A 0.25 | I | 5 | 0 | 37.1 | 11.3 | 553 | 4.7 | 0.5 | O |
| 2 | A 0.35 | I | 5 | 0 | 34.2 | 11.2 | 619 | 4.9 | 1.0 | Δ |
| 3 | A 0.45 | I | 5 | 0 | 32.0 | 10.9 | 703 | 5.2 | 1.5 | Δ |
| 4 | A 1 | I | 0 | 0 | 28.2 | 10.3 | 739 | 6.0 | 2.0 | X |
| 5 | A 1 | I | 1 | 0 | 28.2 | 10.9 | 753 | 5.9 | 2.0 | X |
| 6 | A 1 | I | 2 | 0 | 28.2 | 11.2 | 786 | 5.8 | 2.0 | X |
| 7 | A 1 | I | 5 | 0 | 28.2 | 11.8 | 879 | 6.0 | 2.0 | X |

TABLE-2-continued

| Run No. | Super-plasticizer | Calcium Sulfate /Silica Fume | | Bentnite | | | | W/C (%) | Sl (cm) | Compressive Strength (kgf/cm²) | Weight of Weight Discs (kg) | Width of Crack (mm) | Finish |
|---|---|---|---|---|---|---|---|---|---|---|---|---|---|
| 8  | A | 1    | I   | 10 |     |     |   | 28.2 | 10.5 | 762   | 6.5 | 2.5          | X |
| 9  | A | 1    | I   | 15 |     |     |   | 28.2 | 9.3  | 740   | 7.0 | 3.0          | X |
| 10 | A | 2    | I   | 5  |     |     |   | 27.6 | 9.8  | 903   | 6.2 | 4.0          | X |
| 11 | A | 3    | I   | 5  |     |     |   | 26.8 | 10.2 | 915   | 6.5 | 5.0          | X |
| 12 | A | 5    | I   | 5  |     |     |   | 26.1 | 9.7  | 892   | 6.8 | 6.5          | X |
| 13 | A | 0.25 | I   | 5  | a-2 | 2   |   | 39.8 | 9.3  | 539   | 2.0 | Not observed | O |
| 14 | A | 0.35 | I   | 5  | a-2 | 2   |   | 36.4 | 9.2  | 606   | 2.1 | Not observed | O |
| 15 | A | 0.45 | I   | 5  | a-2 | 2   |   | 34.1 | 9.0  | 698   | 2.3 | Not observed | O |
| 16 | A | 1    | I   | 0  | a-2 | 2   |   | 31.5 | 9.4  | 677   | 2.8 | Not observed | O |
| 17 | A | 1    | I   | 1  | a-2 | 2   |   | 31.5 | 9.6  | 718   | 2.6 | Not observed | O |
| 18 | A | 1    | I   | 2  | a-2 | 2   |   | 31.5 | 10.3 | 769   | 2.5 | Not observed | O |
| 19 | A | 1    | I   | 5  | a-2 | 2   |   | 31.5 | 10.9 | 871   | 2.7 | Not observed | O |
| 20 | A | 1    | I   | 10 | a-2 | 2   |   | 31.5 | 9.7  | 759   | 3.0 | Not observed | O |
| 21 | A | 1    | I   | 15 | a-2 | 2   |   | 31.5 | 9.0  | 731   | 3.5 | Not observed | O |
| 22 | A | 2    | I   | 5  | a-2 | 2   |   | 30.8 | 9.8  | 889   | 3.1 | Not observed | O |
| 23 | A | 3    | I   | 5  | a-2 | 2   |   | 39.4 | 9.4  | 898   | 3.3 | Not observed | O |
| 24 | A | 5    | I   | 5  | a-2 | 2   |   | 28.4 | 9.7  | 876   | 3.5 | Not observed | O |
| 25 | A | 1.2  | I   | 5  | a-1 | 1   |   | 30.4 | 10.2 | 873   | 5.3 | 0.5          | Δ |
| 26 | A | 1.2  | II  | 5  | a-1 | 3   |   | 31.6 | 10.3 | 862   | 3.7 | Not observed | O |
| 27 | H | 1.2  | II  | 5  | a-1 | 6   |   | 34.5 | 10.6 | 855   | 2.2 | Not observed | O |
| 28 | H | 1.2  | II  | 5  | a-1 | 10  |   | 38.1 | 8.6  | 769   | 1.5 | Not observed | Δ |
| 29 | H | 1.2  | II  | 5  | a-2 | 0.1 |   | 29.1 | 11.2 | 880   | 5.5 | 0.5          | Δ |
| 30 | H | 1.2  | II  | 5  | a-2 | 0.5 |   | 30.5 | 10.8 | 877   | 4.2 | Not observed | O |
| 31 | H | 1.2  | II  | 5  | a-2 | 1.0 |   | 31.8 | 10.5 | 860   | 3.3 | Not observed | O |
| 32 | H | 1.2  | II  | 5  | a-2 | 3.0 |   | 34.2 | 9.2  | 849   | 2.4 | Not observed | O |
| 33 | B | 1.0  | III | 2  | a-1 | 3.0 |   | 31.3 | 11.5 | 876   | 3.8 | Not observed | O |
| 34 | C | 1.0  | III | 2  | a-1 | 3.0 |   | 31.7 | 10.8 | 866   | 3.2 | Not observed | O |
| 35 | D | 1.0  | III | 2  | a-2 | 1.0 |   | 32.0 | 9.8  | 852   | 3.0 | Not observed | O |
| 36 | E | 1.0  | IV  | 2  | a-2 | 1.0 |   | 32.3 | 9.9  | 855   | 2.9 | Not observed | O |
| 37 | F | 1.0  | IV  | 2  | a-3 | 1.0 |   | 33.7 | 10.5 | 860   | 2.5 | Not observed | O |
| 38 | G | 1.5  | IV  | 2  | a-3 | 1.0 |   | 35.2 | 11.0 | 847   | 2.3 | Not observed | O |
| 39 | I | 1.5  | IV  | 2  | a-3 | 1.0 |   | 33.4 | 9.7  | 859   | 2.6 | Not observed | O |
| 40 | H | 1.2  | II  | 5  | a-3 | 0.1 |   | 30.4 | 9.7  | 873   | 5.0 | 0.2          | O |
| 41 | H | 1.2  | II  | 5  | a-3 | 0.3 |   | 31.0 | 9.5  | 866   | 3.9 | Not observed | O |
| 42 | H | 1.2  | II  | 5  | a-3 | 0.5 |   | 31.8 | 10.6 | 857   | 3.6 | Not observed | O |
| 43 | H | 1.2  | II  | 5  | a-3 | 1.0 |   | 33.0 | 11.0 | 845   | 2.8 | Not observed | O |
| 44 | H | 1.2  | II  | 5  | a-3 | 3.0 |   | 35.2 | 9.7  | 840   | 2.1 | Not observed | O |
| 45 | H | 1.2  | II  | 5  | a-3 | 6.0 |   | 40.5 | 9.9  | 759   | 1.8 | Not observed | O |
| 46 | A | 1.0  | V   | 1  | a-2 | 1.0 |   | 32.3 | 9.9  | 730   | 3.2 | Not observed | O |
| 47 | A | 1.0  | V   | 2  | a-2 | 1.0 |   | 32.4 | 10.6 | 753   | 3.3 | Not observed | O |
| 48 | A | 1.0  | V   | 5  | a-2 | 1.0 |   | 31.7 | 11.3 | 786   | 3.4 | Not observed | O |
| 49 | A | 1.0  | V   | 10 | a-2 | 6.0 |   | 34.0 | 9.1  | 855   | 3.0 | Not observed | O |
| 50 | A | 1.0  | V   | 15 | a-2 | 6.0 |   | 35.3 | 10.6 | 863   | 3.2 | Not observed | O |
| 51 | A | 1.0  | V   | 20 | a-2 | 6.0 |   | 38.7 | 11.3 | 837   | 5.0 | 0.2          | Δ |
| 52 | A | 1.0  | V   | 5  | non |     |   | 28.5 | 9.3  | 803   | 6.1 | 2.0          | O |
| 53 | A | 1.0  | V   | 10 | non |     |   | 26.0 | 11.0 | 900   | 8.7 | 4.3          | O |
| 54 | A | 1.0  | V   | 15 | non |     |   | 27.1 | 10.5 | 925   | 8.5 | 5.5          | O |
| 55 | A | 1.0  | I   | 5  | V   | 2   | a-3 | 1.0 | 32.0 | 9.7  | 906   | 3.0 | Not observed | O |
| 56 | A | 1.0  | I   | 5  | V   | 3   | a-3 | 1.0 | 34.7 | 9.8  | 920   | 3.2 | Not observed | O |
| 57 | A | 1.0  | I   | 5  | V   | 5   | a-3 | 1.0 | 35.1 | 10.5 | 975   | 3.8 | Not observed | O |
| 58 | A | 1.0  | I   | 5  | V   | 10  | a-3 | 1.0 | 33.0 | 10.7 | 1,078 | 4.3 | 0.2          | O |

Note:
Weight of Weight Discs : Weight at which the plunger penetrates by 7.5 cm.

EXAMPLE 2

The concrete compositions according to Run Nos. 4 to 9 and 16 to 21 in Example 1 were molded to form samples each being 10 cm in diameter and 20 cm in length. After capping for 4 hours, the temperature was raised at a rate of 15° C./hour to 75° C. which temperature was maintained for four hours. The supply of steam was terminated and the samples were allowed to cool spontaneously until the next day. The compressive strength of the samples at the after ageing for 7 days was measured. The results are shown in Table-3.

TABLE 3

| Run No. | Composition | Compressive Strength (kgf/cm²) | |
|---|---|---|---|
| 2-1 | Run No. 4 | 558 | |
| 2-2 | " 5 | 581 | |
| 2-3 | " 6 | 603 | Comp.Ex. |
| 2-4 | " 7 | 669 | |
| 2-5 | " 8 | 769 | |
| 2-6 | " 9 | 742 | |
| 2-7 | " 16 | 470 | |
| 2-8 | " 17 | 573 | |
| 2-9 | " 18 | 595 | |
| 2-10 | " 19 | 662 | Ex. |
| 2-11 | " 20 | 748 | |
| 2-12 | " 21 | 723 | |

At ambient temperatures, the effective amount of addition of calcium sulfates ranges from 1 to 5 parts by weight to 100 parts by weight of cement, as shown in Table-2. For steam curing at 75° C, the effective amount of addition of calcium sulfates has a peak value at 10 parts by weight, with the strength being slightly lowered at 15 parts by weight of calcium sulfate, as shown in Table-3.

When comparing the Examples and the Comparative Examples, it is seen that the water to cement ratio is about 3% higher in the Examples than in the Comparative Examples, but the strength is not correspondingly lowered.

Also, from the Run No. 3-19 to Run No. 3-23 in which the salts of organic acids are used in combination, it is seen that, with the use of the cement additive of the present invention, the concrete strength is significantly increased, while tackiness is also slightly lowered.

Table-4

| Run No. | Inorganic Salt and Amount Added (wt.part) | | W/C (%) | Sl (cm) | Compressive Strength (kgf/cm$^2$) | Weight of Weight Discs (kg) |
|---|---|---|---|---|---|---|
| 3-1 | Non | | 30.5 | 10.2 | 874 | 4.3 |
| 3-2 | Sodium bicarbonate | 0.05 | 30.7 | 10.0 | 870 | 4.1 |
| 3-3 | Sodium bicarbonate | 0.1 | 31.0 | 9.8 | 863 | 3.5 |
| 3-4 | Sodium bicarbonate | 0.2 | 31.3 | 9.5 | 852 | 2.9 |
| 3-5 | Sodium bicarbonate | 0.5 | 3.6 | 9.6 | 841 | 2.3 |
| 3-6 | Sodium bicarbonate | 1.0 | 33.7 | 9.2 | 825 | 2.1 |
| 3-7 | Magnesium sulfate | 0.1 | 31.0 | 9.5 | 885 | 3.1 |
| 3-8 | Magnesium sulfate | 0.2 | 31.5 | 893 | | 2.7 |
| 3-9 | Magnesium sulfate | 0.5 | 34.0 | 8.9 | 851 | 2.2 |
| 3-10 | Sodium carborate | 0.25 | 31.5 | 9.9 | 860 | 2.8 |
| 3-11 | Potassium carborate | 0.25 | 31.5 | 10.3 | 868 | 3.3 |
| 3-12 | Lithium carbonate | 0.25 | 31.5 | 9.0 | 853 | 2.6 |
| 3-13 | Lithium silicate | 0.5 | 33.5 | 9.5 | 850 | 2.4 |
| 3-14 | Sodium silicate | 0.2 | 32.1 | 9.0 | 862 | 2.6 |
| 3-15 | Potassium aluminate | 0.2 | 32.2 | 8.9 | 848 | 2.3 |
| 3-16 | Sodium aluminate | 0.2 | 32.6 | 9.2 | 849 | 2.1 |
| 3-17 | Na-alum | 0.1 | 32.3 | 8.9 | 839 | 2.9 |
| 3-18 | K-alum | 0.1 | 32.3 | 8.5 | 840 | 3.2 |
| 3-19 | Sodium bicanbonate | 0.2 | 31.3 | 10.3 | 929 | 2.8 |
| 3-20 | Magnesium sulfate | 0.2 | 31.5 | 10.2 | 953 | 2.6 |
| 3-21 | Sodium aluminate | 0.2 | 32.6 | 9.5 | 914 | 2.0 |
| 3-22 | Sodium silicate | 0.2 | 32.1 | 9.6 | 898 | 2.3 |
| 3-23 | Na-alum | 0.1 | 32.3 | 8.9 | 890 | 2.5 |
| 3-24 | Aluminum sulfate | 0.05 | 30.9 | 9.5 | 875 | 4.0 |
| 3-25 | Aluminum sulfate | 0.1 | 31.3 | 9.9 | 883 | 3.3 |
| 3-26 | Aluminum sulfate | 0.2 | 32.5 | 10.3 | 895 | 2.5 |
| 3-27 | Aluminum sulfate | 0.5 | 33.8 | 11.2 | 903 | 2.1 |
| 3-28 | Aluminum sulfate | 1.0 | 36.6 | 11.8 | 833 | 1.8 |

EXAMPLE 3

Using the concrete composition of the Run No. 30, tests on the extent of plunger penetration and on the compressive strength of test pieces of 10 cm in diameter and 20 cm in length after ageing 28 days of standard curing were conducted under the same conditions as in Example 1 except that different kinds and amounts of addition of certain inorganic salts were employed. The results are shown in Table-4.

The inorganic salts were added in the amounts shown in Table-4 as anhydrides to 100 parts by weight of cement. The tests were conducted with the use of extra pure reagent.

To each of the compositions of the Run No. 3-19 to No. 3-23, 0.15 part by weight of sodium tartarate was added to 100 parts by weight of cement.

The Run No. 3-1 in Table-4 is a re-test of the Run No. 30. By comparison with the Run No. 3-1, it is seen that the weight of the weight discs when the plunger is stopped after penetration of 7.5 cm is further decreased by using various inorganic salts in combination, that is, tackiness is further reduced and plasticity is increased.

EXAMPLE 4

Using the concrete compositions of Table-5, and also using different kinds and amounts of addition of calcium sulfates and organic acids and salts thereof, strength of test pieces after ageing for 28 days each being 10 cm in diameter and 20 cm in length, mainly cured by standard curing, were measured in a test chamber maintained at 20° C. Although the plunger penetration was not checked specifically, it is apparent from the smaller unit amount of cement and the lower tackiness that more favorable results in the plunger penetration may be realized than those in the Example 1. The test results are shown in Table-6.

TABLE 5

| Comp. No. | Gmax (mm) | S/a (%) | W/C (%) | Air (%) | Sl (cm) | Unit Amount (kg/cm$^3$) | | | | | |
|---|---|---|---|---|---|---|---|---|---|---|---|
| | | | | | | Cement | Water | Sand | Gravel | Superplasticizer | Bentonite |
| I | 25 | 45 | 42 | 30 | 8 ± 2 | 300 | 126 | 889 | 1,104 | A 3 | a-1 3 |
| II | " | " | 43.3 | " | " | 300 | 130 | 877 | 1,098 | A 3 | a-1 9 |
| III | " | " | 45.7 | " | " | 300 | 137 | 858 | 1,088 | A 3 | a-1 18 |
| IV | " | " | 40 | " | " | 300 | 120 | 900 | 1,113 | A 3 | a-1 0 |

The same materials as those employed in the Example 1 were employed, except that the river gravel from Himekawa, Niigata-ken was employed.

The calcium sulfates were employed in place of sand and in an amount calculated as the anhydride. Extra pure reagents were used as the organic acids and salts thereof, which were added to 100 parts of cement.

The Run No. 4-38 in Table-6 represents a Comparative Example. The Run Nos. 4-39 and 4-40 represent the Examples of the invention in which 0.5 part by weight of sodium carbonate is used to 100 parts by weight of cement in combination.

TABLE-6

| Run No. | Comp. No. | Calcium Sulfate (wt. part) | Organic Acid (wt. part) | | Compressive Strength (kgf/cm²) |
|---|---|---|---|---|---|
| 4-1 | I | I | 5 | Sodium tartarate 0.15 | 683 |
| 4-2 | II | I | 5 | Sodium tartarate 0.15 | 680 |
| 4-3 | | I | 5 | Sodium tartarate 0 | 605 |
| 4-4 | | | 5 | Sodium tartarate 0.005 | 625 |
| 4-5 | | | 5 | Sodium tartarate 0.01 | 648 |
| 4-6 | | | 5 | Sodium tartarate 0.05 | 663 |
| 4-7 | | | 5 | Sodium tartarate 0.15 | 675 |
| 4-8 | | | 5 | Sodium tartarate 0.25 | 662 |
| 4-9 | | | 5 | Sodium tartarate 0.35 | 641 |
| 4-10 | | | 5 | Sodium tartarate 0.50 | 602 |
| 4-11 | III | | 5 | Sodium adipate 0.05 | 642 |
| 4-12 | | | 5 | Sodium adipate 0.15 | 662 |
| 4-13 | | | 5 | Sodium adipate 0.35 | 639 |
| 4-14 | | | 5 | Sodium gluconate 0.05 | 657 |
| 4-15 | | | 5 | Sodium gluconate 0.15 | 642 |
| 4-16 | | | 5 | Sodium gluconate 0.35 | 630 |
| 4-17 | III | | 5 | Citric acid 0.15 | 663 |
| 4-18 | | | 5 | Sodium malate 0.15 | 665 |
| 4-19 | | | 5 | Potassium oxalate 0.15 | 653 |
| 4-20 | | | 5 | Maleic acid 0.15 | 660 |
| 4-21 | | | 5 | Sodium fumarate 0.15 | 659 |
| 4-22 | | | 5 | Sodium malonate 0.15 | 648 |
| 4-23 | III | | 5 | Sodium saccinate 0.15 | 657 |
| 4-24 | | | 5 | Sodium gluconate 0.15 | 669 |
| 4-25 | | | 5 | Sodium lactate 0.15 | 642 |
| 4-26 | | | 5 | Sodium heptonate 0.15 | 657 |
| 4-27 | | | 5 | Sodium glycollate 0.15 | 650 |
| 4-28 | III | IV | 1 | Zinc tartarate 0.10 | 495 |
| 4-29 | | | 2 | Ammonium tartarate 0.10 | 537 |
| 4-30 | | | 5 | Potassium tartarate 0.15 | 682 |
| 4-31 | | | 10 | Calcium tartarate 0.15 | 620 |
| 4-32 | | | 15 | Strontiun tartarate 0.15 | 531 |
| 4-33 | | | 5 | Iron tartarate 0.15 | 670 |
| 4-34 | | | 5 | Calcium tartarate 0.10 | 632 |
| 4-35 | | | 5 | Lead tartarate 0.10 | 621 |
| 4-36 | | | 5 | Manganese tararate 0.15 | 653 |
| 4-37 | | | 5 | Lithium tartarate 0.15 | 662 |
| 4-38 | IV | I | 5 | Potassium tartarate 0.15 | 695 |
| 4-39 | III | I | 5 | Potassium tartarate 0.15 | 798 |
| 4-40 | | | 5 | Sodium malate 0.15 | 802 |

It is seen that, with the use of the cement additive of the present invention, the water to cement ratio tends to be increased with the decrease in the amount of the cement additive added to cement, but the strength is substantially unchanged, as indicated from the Run Nos. 4-1, 4-2 and 4-7.

Also, when the organic acids and salts thereof are added to cement in amounts increased, the concrete strength is gradually increased and reaches a peak value at about 0.15 part by weight, with the strength for the organic acid content in the range from 0.005 to 0.5 part by weight being equal to or higher than that for the null organic acid content, as indicated from the Run Nos. 4-3 to Run No. 4-10.

When the inorganic salts of alkali metals are used simultaneously in combination, the concrete strength is improved significantly, as indicated from Run Nos. 4-39 and 4-40.

It is also seen that, while anhydrous calcium sulfate is most effective to increase strength, the optimum amount of addition of calcium sulfate tends to be increased even at ambient temperatures when the organic acids and salts thereof are simultaneously employed.

EXAMPLE 5

The concrete samples were prepared using the basic concrete composition shown in Table 7 but using different kinds and amounts of addition of the plasticizers and citric acid or citrates and different amounts of addition of bentonites. After kneading, changes in slump with lapse of time, tackiness, cracking before hardening and compressive strength after ageing for 28 days by standard curing, were measured as for these samples.

In making the above measurement, the concrete samples were kneaded for three minutes in a room maintained at 20° C. with the use of a 60 lit. capacity forcedly kneading type mixer, and slump and tackiness were measured immediately.

TABLE 7

| Gmax (mm) | S/a (%) | W/C (%) | Air (%) | Sl (cm) | Unit Amount (kg/m³) | | | |
|---|---|---|---|---|---|---|---|---|
| | | | | | Cement | Water | Sand | Crushed Stone |
| 15 | 40 | 36 | 2.0 | 8 ± 2 | 500 | 180 | 680 | 1,032 |

Materials Used
Cement: Normal Portland Cement produced by Denki Kagaku Kogyo KK
Sand: River Sand from Himekawa, Niigata Prefecture
Crushed Stone: Crushed stone from Himekawa, Niigata Prefecture When each of the superplasticizers is added to the concrete composition of Table-7, a smaller unit amount of water should suffice to obtain the same slump. However, in this case, the unit amount of water was decreased for slump matching.

It is noted that, in the present specification, the amounts of addition of the respective components of the cement additive of the present invention are expressed in terms of parts by weight to 100 parts by weight of cement.

In Table-8, the Run Nos. 5-1, 5-2 and 5-13 represent Comparative Examples.

As shown in Table-8, the amounts of addition of the superplasticizers less than 0.35 part by weight are not desirable especially for slump maintenance, while the addition in excess of 5 parts by weight is also not desirable since the increase in strength is not expected by the addition. It may also be easily surmised that the increased amount of addition of bentonites is required to lower the tackiness.

The amount of addition of citric acid and citrates less than 0.005 part by weight results in a shorter slump maintenance time and the poorer workability in plants of concrete products. With the addition in excess of 0.5 part by weight, the concrete strength is presumably lowered.

It has been shown that, when used simultaneously with bentonites, citric acid and citrates tend to lower the concrete tackiness.

Even when added in the same amount, bentonites are effective to a different extent depending on their degree of swelling. With the amount of addition of bentonites less than 0.1 part by weight to 100 parts by weight of cement, the effect of addition is small while the addition in excess of 10 parts by weight is not desirable from the viewpoint of concrete strength since the water to cement ratio in such case is drastically increased.

It has been shown that, when added in moderate amounts, bentonites are effective to lower tackiness without drastically affecting the effect of preventing slump drop and the strength, while being effective to prevent cracking upon drying before concrete hardening.

It is noted that a larger length of crack in the Run Nos. 5-1 and 5-2 (comparative examples), above all, in the Run No.5-2, is presumably attributable to accelerated vaporization of water contents in the concrete caused by prolonged slump maintenance and set retarding brought about by the addition of citric acid.

EXAMPLE 6

Concrete samples were prepared using the concrete composition of the Run No. 5-16 but using different kinds and amounts of addition of calcium sulfates, and were kneaded at room temperature of 10° C. for measuring the tackiness and 28-day compressive strength. For measuring the compressive strength, these samples were formed into specimens each being 10 cm in diameter and 20 cm in length, these specimens being kept at

TABLE - 8

| Run No. | Composition (wt. part) | | | | | W/C (%) | Sl (cm) | Change of Slump with lapse of time (cm) | | | | Weight of Weight Discs (kg) | Width of Crack (mm) | Compressive Strength (kgf/cm$^2$) |
|---|---|---|---|---|---|---|---|---|---|---|---|---|---|---|
| | Superplasticizer | | Citric Acid and Citrate | | Bentonite | | | 30 | 60 | 120 | 180 min | | | |
| 5-1 | | | — | | — | 26.5 | 7.8 | 3.0 | 0 | — | — | 6.4 | 5 | 756 |
| 5-2 | | | | | a-2 0 | 27.9 | 8.1 | — | 8.3 | — | 7.9 | 6.0 | 9 | 769 |
| 5-3 | | | | | a-2 0.1 | 28.4 | 7.5 | — | 7.6 | — | 7.3 | 5.3 | 2 | 763 |
| 5-4 | | | Citric acid | 0.15 | a-2 1.0 | 30.0 | 7.0 | — | 6.9 | — | 6.7 | 3.5 | Not observed | 752 |
| 5-5 | | | | | a-2 3.0 | 33.2 | 8.1 | — | 8.2 | — | 7.6 | 2.8 | Not observed | 745 |
| 5-6 | A | 1.0 | | | a-2 5.0 | 35.8 | 7.3 | — | 6.3 | — | 4.7 | 2.4 | Not observed | 733 |
| 5-7 | | | | | a-1 1.0 | 31.5 | 8.2 | — | 8.0 | — | 7.5 | 4.8 | Not observed | 751 |
| 5-8 | | | | | a-1 5.0 | 32.3 | 7.5 | — | 6.8 | — | 5.0 | 3.0 | Not observed | 747 |
| 5-9 | | | | | a-1 10.0 | 37.6 | 6.8 | — | 5.0 | — | 3.1 | 2.6 | Not observed | 702 |
| 5-10 | | | | | a-3 1.0 | 29.5 | 9.0 | — | 8.7 | — | 7.0 | 3.8 | Not observed | 771 |
| 5-11 | | | | | a-3 3.0 | 32.1 | 8.8 | — | 8.3 | — | 6.0 | 3.2 | Not observed | 756 |
| 5-12 | | | | | a-3 5.0 | 34.6 | 7.1 | — | 5.2 | — | 2.9 | 2.8 | Not observed | 738 |
| 5-13 | H | 0.35 | Sodium citrate | 0.15 | a-2 0 | 33.0 | 7.3 | 6.1 | 3.2 | — | — | 3.6 | 1.0 | 592 |
| 5-14 | | 0.35 | | | a-2 2.5 | 35.7 | 7.2 | 6.2 | 3.0 | — | — | 2.1 | Not observed | 586 |
| 5-15 | | 0.5 | | | a-2 2.5 | 34.2 | 7.8 | 7.5 | 6.2 | 2.9 | — | 2.3 | Not observed | 671 |
| 5-16 | | 1.0 | | | a-2 2.5 | 33.4 | 8.1 | — | 8.0 | — | 6.9 | 2.6 | Not observed | 757 |
| 5-17 | | 2.0 | | | a-2 2.5 | 30.0 | 9.3 | — | 9.8 | — | 9.0 | 2.9 | Not observed | 779 |
| 5-18 | | 3.0 | | | a-2 2.5 | 28.5 | 8.9 | — | 9.5 | — | 9.2 | 3.3 | Not observed | 823 |
| 5-19 | | 5.0 | | | a-2 2.5 | 28.1 | 9.5 | — | 10.3 | — | 9.8 | 3.5 | Not observed | 818 |
| 5-20 | | 5.0 | | | a-1 10 | 32.0 | 6.9 | — | 7.0 | — | 5.2 | 3.1 | Not observed | 771 |
| 5-21 | A | 1.0 | Potassium citrate | 0.005 | a-1 5 | 30.7 | 9.8 | 5.9 | 3.4 | — | — | 3.8 | Not observed | 713 |
| 5-22 | | | | 0.05 | a-1 5 | 31.1 | 9.5 | 7.8 | 5.9 | 2.3 | — | 3.5 | Not observed | 729 |
| 5-23 | | | | 0.1 | a-1 5 | 32.0 | 9.0 | 8.6 | 8.0 | — | 6.1 | 3.2 | Not observed | 738 |
| 5-24 | | | | 0.3 | a-1 5 | 32.4 | 8.3 | — | 8.5 | — | 8.0 | 2.8 | Not observed | 725 |
| 5-25 | | | | 0.5 | a-1 5 | 33.0 | 7.9 | — | 8.3 | — | 8.9 | 2.2 | Not observed | 709 |
| 5-26 | C | 0.8 | Lithium citrate | 0.15 | a-2 2.5 | 31.5 | 8.3 | — | 7.7 | — | 6.8 | 2.8 | Not observed | 781 |
| 5-27 | | | Calcium citrate | 0.15 | a-2 2.5 | 31.5 | 8.5 | — | 8.0 | — | 7.2 | 2.9 | Not observed | 752 |
| 5-28 | | | Magnesium citrate | 0.15 | a-2 2.5 | 31.5 | 7.8 | — | 8.1 | — | 6.4 | 2.5 | Not observed | 777 |
| 5-29 | | | Strontium citrate | 0.15 | a-2 2.5 | 31.5 | 8.0 | — | 8.2 | — | 7.0 | 3.0 | Not observed | 761 |
| 5-30 | | | Ammonium citrate | 0.15 | a-2 2.5 | 31.5 | 7.1 | — | 6.8 | — | 5.5 | 2.6 | Not observed | 749 |
| 5-31 | | | Iron citrate | 0.15 | a-2 2.5 | 31.5 | 7.9 | — | 8.1 | — | 6.6 | 2.7 | Not observed | 750 |
| 5-32 | | | Zinc citrate | 0.1 | a-2 2.5 | 31.5 | 9.8 | — | 10.0 | — | 8.1 | 2.4 | Not observed | 721 |
| 5-33 | | | Lead citrate | 0.1 | a-2 2.5 | 31.5 | 9.8 | — | 9.4 | — | 7.8 | 2.6 | Not observed | 719 |
| 5-34 | | | Copper citrate | 0.1 | a-2 2.5 | 31.5 | 9.9 | — | 9.5 | — | 7.0 | 2.5 | Not observed | 738 |

10° C. in a room for two days and being then cured in water at 10° C. after mold stripping. The results are shown in Table-9.

In Table-9, the Run No. 6-1 is a re-testing of the composition of the Run No. 5-16.

When used in moderate amounts, calcium sulfates are effective to reduce tackiness while increasing strength. It has been shown that the addition of calcium sulfates in more than 15 parts by weight is not desirable since the strength is further decreased with increase in tackiness.

TABLE-9

| Run No. | Calcium Sulfate Silica Fume (wt. part) | | W/C (%) | Sl (cm) | Weight of Weight Discs (kg) | Compressive Strength (kgf/cm$^2$) |
|---|---|---|---|---|---|---|
| 6-1 | — | | 33.2 | 9.6 | 3.4 | 729 |
| 6-2 | I | 1 | 32.2 | 9.5 | 3.1 | 762 |
| 6-3 | I | 2 | 32.2 | 9.4 | 2.8 | 803 |
| 6-4 | I | 5 | 32.2 | 9.1 | 3.0 | 986 |
| 6-5 | I | 7 | 32.2 | 8.7 | 3.2 | 995 |
| 6-6 | I | 10 | 32.5 | 8.0 | 3.5 | 897 |
| 6-7 | I | 15 | 33.0 | 7.1 | 3.8 | 776 |
| 6-8 | IV | 1 | 32.2 | 9.3 | 3.0 | 753 |
| 6-9 | IV | 5 | 32.2 | 9.0 | 3.1 | 949 |
| 6-10 | IV | 10 | 32.8 | 8.1 | 3.6 | 821 |
| 6-11 | IV | 15 | 33.4 | 6.9 | 3.9 | 739 |
| 6-12 | II | 1 | 32.2 | 9.7 | 2.9 | 742 |
| 6-13 | II | 5 | 32.2 | 9.1 | 3.0 | 909 |
| 6-14 | II | 10 | 31.6 | 7.9 | 3.5 | 838 |
| 6-15 | II | 15 | 33.2 | 7.0 | 4.0 | 752 |
| 6-16 | III | 1 | 32.2 | 9.8 | 2.9 | 738 |
| 6-17 | III | 5 | 32.2 | 9.3 | 2.8 | 872 |
| 6-18 | III | 10 | 32.2 | 8.6 | 3.2 | 853 |
| 6-19 | III | 15 | 32.5 | 7.4 | 3.6 | 770 |
| 6-20 | V | 1 | 32.3 | 8.5 | 3.0 | 731 |
| 6-21 | | 2 | 32.5 | 8.0 | 3.1 | 753 |
| 6-22 | | 5 | 31.3 | 7.3 | 3.3 | 797 |
| 6-23 | V | 10 | 28.0 | 8.2 | 4.2 | 863 |
| 6-24 | | 15 | 29.3 | 9.0 | 4.8 | 970 |
| 6-25 | | 20 | 32.5 | 9.3 | 5.7 | 960 |
| 6-26 | I 5 V | 2 | 33.0 | 9.0 | 2.7 | 992 |
| 6-27 | 5 | 3 | 33.2 | 9.1 | 3.2 | 1053 |
| 6-28 | 5 | 5 | 32.0 | 8.8 | 3.8 | 1128 |
| 6-29 | 5 | 10 | 29.0 | 8.6 | 4.6 | 1259 |

EXAMPLE 7

The procedure of the Example 6 was followed except that the kinds and the amounts of addition of the inorganic salts in the compositions of the Run Nos. 6-1, 6-4 and 6-28 were changed, and the changes in slump with lapse of time were additionally measured.

The results are shown in Table-10.

It is noted that the inorganic salts were added to cement in an amount calculated as anhydrides.

In Table-10, the Run No.7-1 and the Run No. 7-20 are re-testing of the Run No. 6-1 and the Run No. 6-4, respectively, and are resorted to for comparison in order to check the effect of addition of inorganic salts.

The amount of these inorganic acids less than 0.05 part by weight has a little effect in reducing tackiness and hence is not desirable, while the amount in excess of 1.0 part by weight also has a little effect in reducing tackiness while tending to lower the strength.

TABLE - 10

| Run No. | Comp No. | Inorganic Salt (wt. part) | | W/C (%) | Sl (cm) 0 | Sl (cm) 180 min | Weight of Weight Discs (kg) | Compressive Strength (kgf/cm$^2$) |
|---|---|---|---|---|---|---|---|---|
| 7-1 | | Sodium bicarbonate | 0 | 33.2 | 9.5 | 9.1 | 3.5 | 731 |
| 7-2 | | Sodium bicarbonate | 0.05 | 33.2 | 9.6 | 9.3 | 3.2 | 743 |
| 7-3 | | Sodium bicarbonate | 0.1 | 33.5 | 9.2 | 9.0 | 2.7 | 769 |
| 7-4 | No. | Sodium bicarbonate | 0.2 | 33.8 | 8.8 | 9.1 | 2.4 | 803 |
| 7-5 | 6-1 | Sodium bicarbonate | 0.5 | 34.2 | 8.3 | 9.4 | 2.2 | 786 |
| 7-6 | | Sodium bicarbonate | 1.0 | 34.8 | 7.5 | 7.0 | 2.1 | 759 |
| 7-7 | | Magnesium sulfate | 0.05 | 33.6 | 9.3 | 8.9 | 3.0 | 757 |
| 7-8 | | Magnesium sulfate | 0.25 | 34.0 | 8.7 | 7.2 | 2.3 | 823 |
| 7-9 | | Magnesium sulfate | 0.5 | 34.7 | 8.0 | 5.1 | 2.0 | 777 |
| 7-10 | | Na—alum | 0.1 | 34.0 | 8.4 | 6.3 | 2.5 | 753 |
| 7-11 | | K—alum | 0.1 | 34.0 | 8.0 | 6.4 | 2.4 | 748 |
| 7-12 | | Sodium carbonate | 0.2 | 33.8 | 9.3 | 10.2 | 2.0 | 1159 |
| 7-13 | | Potassium carbonate | 0.2 | 33.8 | 9.0 | 9.8 | 2.0 | 1167 |
| 7-14 | | Lithium carbonate | 0.2 | 33.8 | 9.5 | 10.7 | 1.8 | 1170 |
| 7-15 | No. | Sodium silicate | 0.5 | 34.1 | 9.1 | 8.7 | 1.8 | 1137 |
| 7-16 | 6-4 | Potassium silicate | 0.3 | 33.8 | 9.0 | 9.2 | 2.1 | 1159 |
| 7-17 | | Lithium silicate | 0.1 | 33.2 | 8.1 | 8.6 | 2.3 | 1122 |
| 7-18 | | Sodium aluminate | 0.3 | 33.8 | 8.8 | 8.5 | 1.9 | 1169 |
| 7-19 | | Potassium aluminate | 0.3 | 33.8 | 9.1 | 9.0 | 2.1 | 1153 |
| 7-20 | | | | 33.2 | 9.4 | 9.0 | 3.0 | 981 |
| 7-21 | | Aluminum sulfate | 0.05 | 33.4 | 9.4 | 9.3 | 3.1 | 747 |
| 7-22 | | | 0.1 | 34.1 | 9.7 | 9.0 | 2.5 | 768 |
| 7-23 | No. | | 0.2 | 34.8 | 10.3 | 9.1 | 2.2 | 780 |
| 7-24 | 6-1 | | 0.5 | 35.7 | 8.9 | 6.3 | 1.8 | 793 |
| 7-25 | | | 1.0 | 37.0 | 9.2 | 5.0 | 1.6 | 752 |
| 7-26 | No. | Sodium bicarbonate | 0.2 | 32.0 | 10.1 | 10.0 | 2.9 | 1135 |
| 7-27 | 6-28 | Aluminum sulfate | 0.5 | 36.3 | 9.5 | 5.8 | 2.3 | 1179 |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A cement additive comprising a superplasticizer, an inorganic strength increasing agent, an organic acid and bentonite, said superplasticizer being selected from the group consisting of polyalkylaryl sulfonate superplasticizer and melamine/formalin resin sulfonate superplasticizer, said inorganic strength increasing agent being selected from the group consisting of calcium sulfate, silica fumes and a mixture thereof, said organic acid being selected from the group consisting of oxalic acid, maleic acid, fumaric acid, malonic acid, succinic acid, glutaric acid, adipic acid, lactic acid, heptonic acid, gluconic acid, glycolic acid, malic acid, tartaric acid, citric acid, salts thereof, derivatives thereof and a mixture thereof, said superplasticizer being contained in an amount of 0.25 to 5 parts by weight based on 100 parts by weight of cement, said calcium sulfate being contained in an amount not more than 15 parts by weight, calculated as anhydride, based on 100 parts by weight of cement, said silica fume being contained in an amount of not more than 20 parts by weight based on 100 parts by weight of cement, said organic acid being contained in an amount of 0.005 to 0.5 parts by weight based on 100 parts by weight of cement, and said bentonite being contained in an amount of 0.1 to 10 parts by weight based on 100 parts by weight of cement.

2. The cement additive according to claim 1 wherein said polyalkylaryl sulfonate superplasticizer is selected from the group consisting of a condensation product of naphthalene sulfonic acid with formalin and a salt thereof, a condensation product of methylnaphthalene sulfonic acid with formalin and a salt thereof, a condensation product of anthracene sulfonic acid with formalin and a salt thereof, and a mixture thereof.

3. The cement additive according to claim 1 wherein said calcium sulfate has a specific surface area of not less than 2,000 $cm^2/g$ in terms of Blaine value.

4. The cement additive according to claim 1 wherein said calcium sulfate is selected from the group consisting of Type II anhydrous calcium sulfate, Type III anhydrous calcium sulfate, calcium sulfate hemihydrate, calcium sulfate dihydrate and a mixture thereof.

5. The cement additive according to claim 1 wherein said cement additive further comprises an inorganic salt selected from the group consisting of carbonates, bicarbonates, silicates and aluminates of alkali metals, alums of sodium and potassium, aluminum sulfate, magnesium sulfate and a mixture thereof.

6. The cement additive according to claim 5 wherein said inorganic salt is contained in an amount of not more than 1.0 part by weight to 100 parts by weight of cement.

* * * * *